No. 696,590. Patented Apr. 1, 1902.
J. C. A. PLETT.
PACKING FOR STUFFING BOXES.
(Application filed June 20, 1901.)
(No Model.)

Witnesses:
William Schulz.
Edward Ray.

Inventor:
Johann Carl Adolf Plett
per Roeder & Briesen Attorneys.

THE NORRIS PETERS CO., PHOTO-LITHO., WASHINGTON, D. C.

UNITED STATES PATENT OFFICE.

JOHANN CARL ADOLF PLETT, OF HAMBURG, GERMANY.

PACKING FOR STUFFING-BOXES.

SPECIFICATION forming part of Letters Patent No. 696,590, dated April 1, 1902.

Application filed June 20, 1901. Serial No. 65,255. (No model.)

*To all whom it may concern:*

Be it known that I, JOHANN CARL ADOLF PLETT, a citizen of Germany, residing at Hamburg, Germany, have invented certain new and useful Improvements in Packing for Stuffing-Boxes, of which the following is a specification.

Metallic packing for stuffing-boxes as hitherto used, whether or not it consists of a single conical ring or several conical rings arranged one over another, has the disadvantage that it breaks easily, especially in large engines, as it cannot yield to the vibrations of the piston-rod. Attempts have recently been made to obviate this disadvantage by allowing the packing to have play in the stuffing-box and pressing it against the surfaces to be made tight by means of springs; but apart from the fact that springs lose their resiliency in the course of time, so that the packing ceases to be effective, these methods are so complicated that they cannot be expected to come into general use.

Now this invention has for its object to provide a packing for stuffing-boxes which is adapted to yield when the piston-rod vibrates and is extremely simple in construction.

Figure 1:
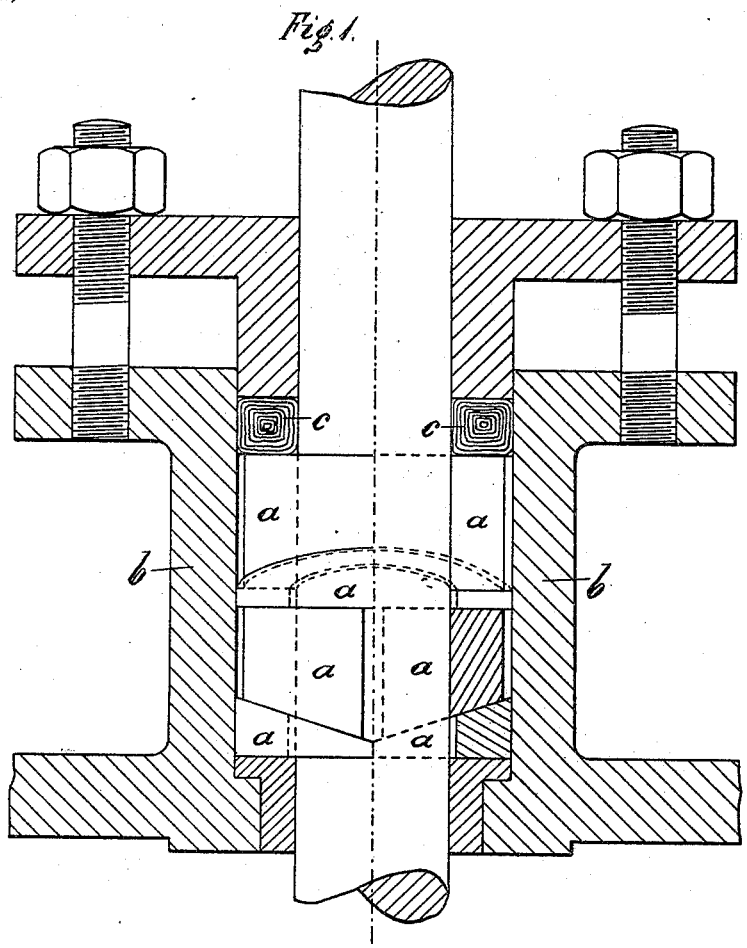
Figure 2:
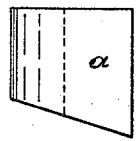
Figure 2:
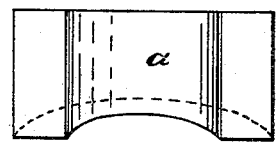
Figure 3:
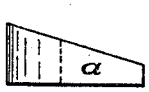

Figure 1 of the accompanying drawings is a sectional elevation of packing according to this invention, and Figs. 2 and 3 are elevations of two sets of half-rings of the packing in two positions at right angles to each other.

The packing comprises several wedge-shaped half-rings $a$, placed in the stuffing-box $b$ in such a way that two such pieces form a complete ring, the lowermost of which rests with its flat face on the neck-ring. Another ring $a$, likewise composed of two parts, is then placed on the first-mentioned ring in such a way that its wedge-shaped face bears on the wedge-shaped face of the first-mentioned ring. A third ring of the same kind is then placed with its flat face on the second ring, and a fourth ring in two parts is placed with its wedge-shaped face on the third ring, the joints of the third and fourth rings being ninety degrees in advance of the joints of the first and second rings. A soft ring $c$, of ordinary fibrous packing material, is placed over the fourth ring, so as to allow the packing to yield in a longitudinal direction, even when the follower is screwed up. If the piston-rod presses against any of the rings $a$ in consequence of vibration, the ring affected slides over the inclined surface of the adjacent ring, and therefore yields to the pressure. To enable the several parts $a$ of the rings to move in this manner, the internal diameter of the lowest ring is somewhat greater than that of the piston-rod, while its external diameter is exactly the same as the internal diameter of the stuffing-box. On the other hand, the internal diameter of the second ring is exactly the same as that of the piston-rod, while its external diameter is somewhat less than the internal diameter of the stuffing-box. The remaining rings are constructed in a similar manner.

Such packing yields, as will be readily understood, when pressed by the piston-rod, but at the same time makes a tight joint, as the joints of all the rings are separated from each other.

I claim—

A piston-packing composed of a series of superposed semicircular wedge-shaped rings arranged in pairs, both faces of each ring being formed by straight planes of which one extends at right angle to the piston-axis, while the other is inclined to said axis, substantially as specified.

Signed at Hamburg, Germany, this 8th day of June, A. D. 1901.

JOHANN CARL ADOLF PLETT.

Witnesses:
 MAX FOUGUCT,
 FRANZ STEFFENS.